Oct. 14, 1952        H. T. PLATZ        2,613,903
DUAL LOAD BALANCING HOIST
Filed Oct. 11, 1950        4 Sheets-Sheet 1
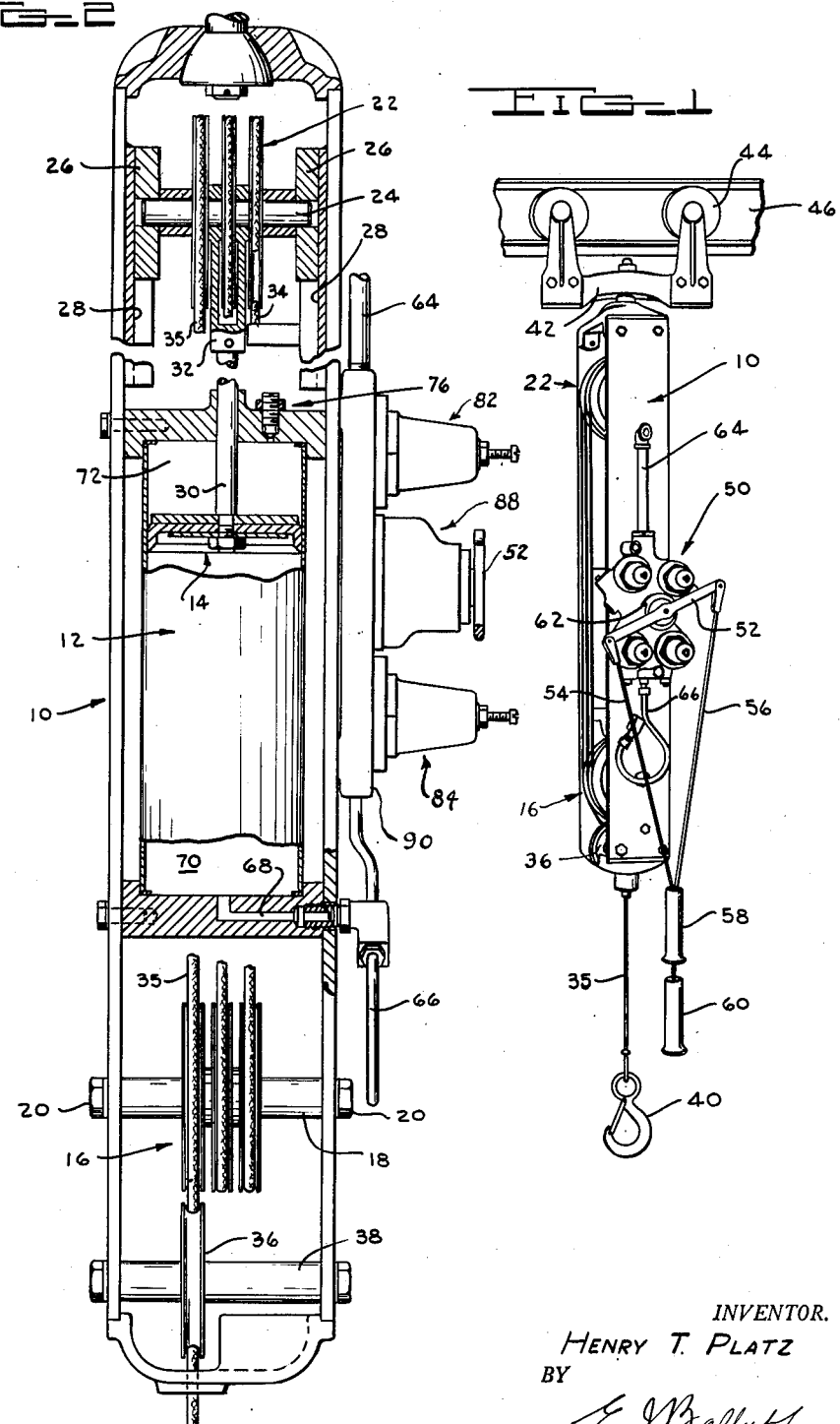
INVENTOR.
HENRY T. PLATZ
BY
*E. J. Balluff*
ATTORNEY

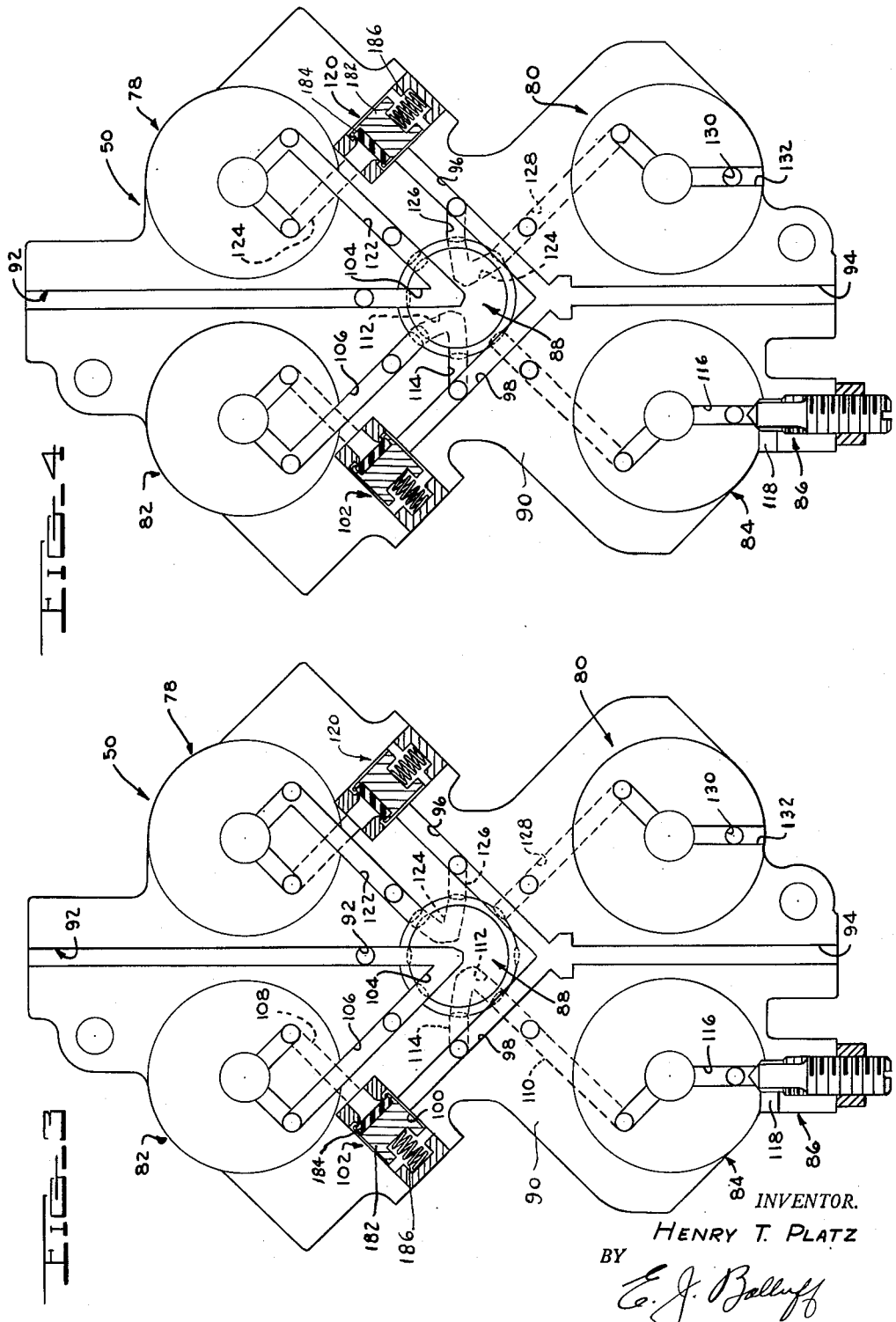

Oct. 14, 1952 H. T. PLATZ 2,613,903
DUAL LOAD BALANCING HOIST
Filed Oct. 11, 1950 4 Sheets-Sheet 3
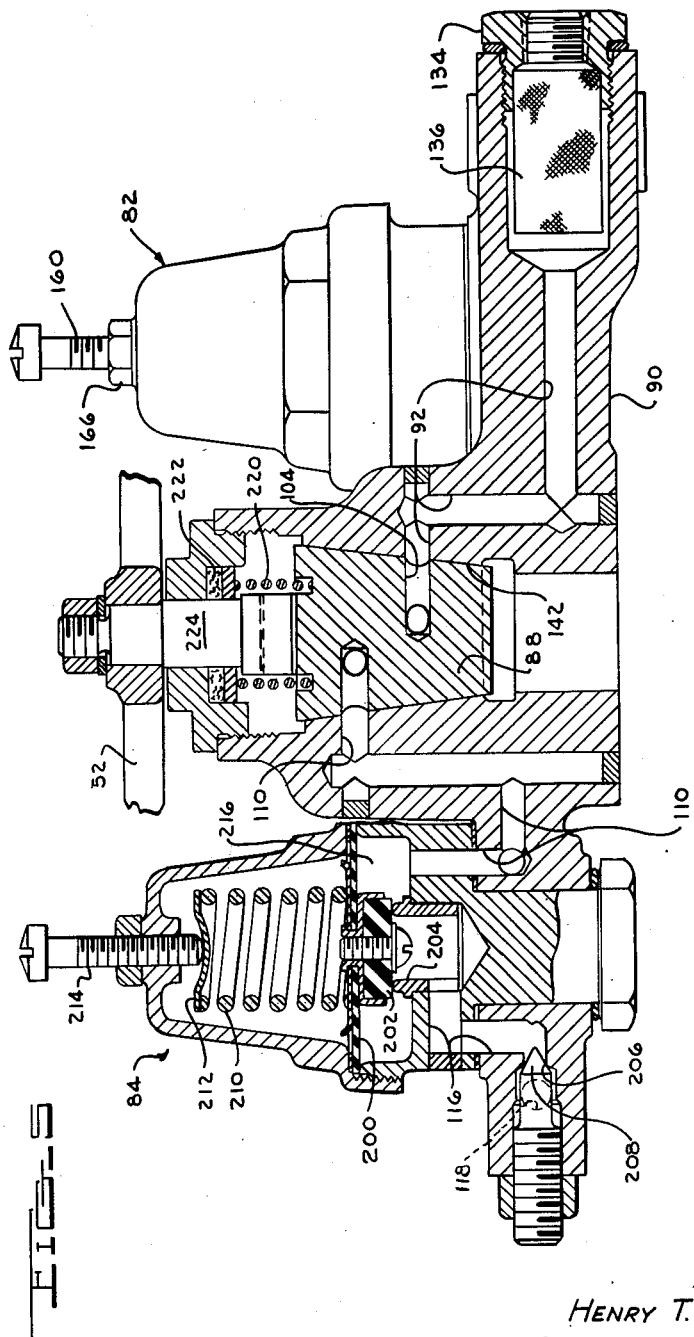
INVENTOR.
HENRY T. PLATZ
BY
E. J. Balluff
ATTORNEY

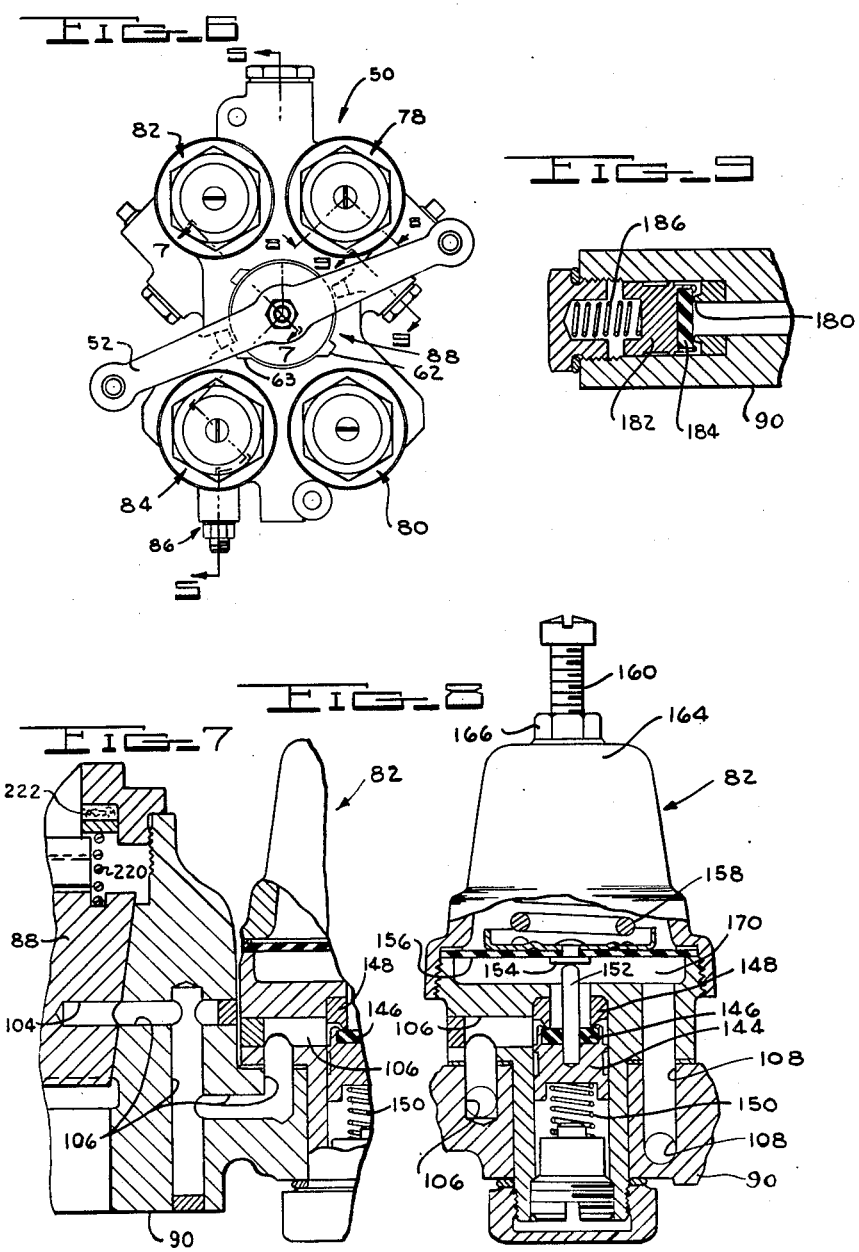

Patented Oct. 14, 1952

2,613,903

UNITED STATES PATENT OFFICE 2,613,903

DUAL LOAD BALANCING HOIST

Henry T. Platz, Detroit, Mich., assignor to The Platz Company, Inc., Detroit, Mich., a corporation of Michigan Application October 11, 1950, Serial No. 189,638

13 Claims. (Cl. 248—328)

This invention relates to load balancers or balancing hoists which are useful for neutralizing the weight of a load in any position of the balancing range, and in particular has reference to a balancer or hoist of this type which is operable for counterbalancing a plurality of loads of different predetermined weights.

As illustrated in the embodiment of the invention selected for purposes of illustration, a balancing hoist comprises in general a cylinder, a piston operatively arranged in said cylinder for movement relative thereto, load supporting means connected to one of said members, a fluid pressure system connected to one end of said cylinder on one side of said piston for supplying fluid under pressure to said end of said cylinder, said fluid pressure system including a high pressure side adapted to supply to said end of said cylinder pressure fluid at a pressure which will counterbalance a predetermined load supported by said means, a low pressure side adapted to supply to said end of said cylinder pressure fluid at a pressure which will counterbalance the weight of said means, a line pressure side for supplying pressure fluid to said high and low pressure sides, and a control operable for selectively connecting and disconnecting the high and low pressure sides of said system to and from said line pressure side of said system.

According to my invention, the balancing hoist neutralizes the weight of the load in any position of the balancing range so that very little effort on the part of the operator is required to raise or lower the balanced load. This balancing hoist is particularly useful in shops and factories for handling loads, such as heavy tools and heavy pieces of work on which various operations are to be performed, and permits the operator to handle and move the load with very little effort.

The balancing hoist herein disclosed is an improvement in certain respects over the pneumatic counterbalancing fixture disclosed in my earlier Patent No. 2,176,979, issued October 24, 1939. However, according to the present invention, the balancing hoist is constructed and arranged so as to counterbalance the weight of the load supporting hook and to counterbalance the weight of the hook plus the load carried thereby and is provided with a control whereby it may be adjusted to counterbalance either of such loads. In addition, the counterbalancing hoist includes provisions whereby it may be adjusted within limits to handle loads of various weights, and also includes certain safety features which take care of situations caused by failure of the pressure and inadvertent shifting from the high pressure side of the system to the low pressure side, and vice versa.

Principal objects of the invention, therefore, are to provide:

A new and improved load balancer;

A multiple load balancing hoist; and

A balancing hoist for counterbalancing various loads which permits such loads to be handled and moved by the operator with very little effort.

Other and further objects of the invention will be apparent from the following description and claims and may be understood by reference to the accompanying drawings, of which there are four sheets, which by way of illustration show a preferred embodiment of the invention and what I now consider to be the best mode in which I have contemplated applying the principles of my invention. Other embodiments of the invention may be used without departing from the scope of the present invention as set forth in the appended claims.

In the drawings:

Fig. 1 is a perspective view of a counterbalancing hoist embodying the invention;

Fig. 2 is an enlarged fragmentary cross sectional view of the device illustrated in Fig. 1 with certain of the parts shown in elevation;

Fig. 3 is a schematic view of the control for the fluid pressure system shown in its low pressure position;

Fig. 4 is a schematic view of the control for the fluid pressure system shown in its high pressure position;

Fig. 5 is an enlarged sectional view taken generally along the staggered line 5—5 of Fig. 6;

Fig. 6 is an elevational view of the control for the fluid pressure system;

Fig. 7 is an enlarged fragmentary sectional view taken generally along the line 7—7 of Fig. 6;

Fig. 8 is an enlarged fragmentary sectional view taken generally along the staggered line 8—8 of Fig. 6 through the pressure regulator of the high pressure side of the system; and Fig. 9 is an enlarged fragmentary sectional view taken along the line 9—9 of Fig. 6 and illustrating the check valve on the downstream side of the high pressure side of the system.

As shown in Figs. 1 and 2, the balancing hoist comprises in general a support or frame 10 to which is secured an air cylinder 12 provided with a piston 14 which is reciprocably arranged in the cylinder for movement relative thereto. A series of pulleys or sheaves indicated generally at 16 is journalled on an axle 18 fixedly secured to the support 10 by bolts 20. A second series of pulleys or sheaves 22 is journalled on an axle 24 carried by blocks 26 which are slidable in the channel guides 28 fixed to the sides of the frame 10 so that the pulleys or sheaves 22 are movable toward and away from the cylinder 12. The piston 14 is connected by a rod 30 and fork 32 to the axle 24 so that the sheaves 22 will move with the piston 14.

One end 34 of a cable 35 is fixed such as by securing it to the frame or support 10, and the cable is passed over one of the sheaves of the movable set 22 and then over one of the sheaves of the fixed set 16, and then over one of the sheaves of the movable set 22, and is then passed over a grooved wheel 36 journalled on an axle 38 fixedly supported adjacent the lower end of the frame 10. After passing over the wheel 36, the cable 35 extends downwardly through an opening in the frame 10 and has secured thereto a load supporting hook 40. As each set of sheaves includes three pulleys, this provides a 6 to 1 ratio of load to air pressure so that with a six inch movement of the load or hook 40, the piston will move one inch. Obviously, any other suitable reduction may be employed.

The frame 10 is swivelled on a carrier 42 having wheels 44 which run on an overhead track 46. A control indicated generally at 50 is mounted on the frame 10 and is provided with an operating lever 52. As shown in Fig. 1, the control is set for the low pressure side of the system. The lever 52 is shifted from one position to the other or to a neutral intermediate position by means of cables 54 and 56 having tubular handles 58 and 60, the cable 54 being attached to the handle 58 while the cable 56 passes freely through the tubular handle 58 and is secured to the handle 60. By pulling downwardly on the handle 60 the lever 52 may be shifted clockwise to a neutral position (in which the lever is horizontally arranged), or to the high pressure position in which the lever 52 is tilted opposite and in an amount equal to that shown in Fig. 1. Stops 62 engageable by a part of the lever 52 limit the clockwise rotation of the lever 52 at the high pressure position, and similar but oppositely positioned stops 63 limit the counterclockwise rotation of the lever 52 at the low pressure position thereof shown in Figs. 1 and 6. Thus, by pulling down on either of the handles 58 and 60, the operator may readily shift the pressure system of the hoist from the low pressure to the high pressure side thereof and vice versa.

When the pressure system of the hoist is set on the low pressure side, as shown in Fig. 1, it is adapted to counterbalance the load of the hook 40, the movable set of sheaves 22, and the cable 35, which may weigh as much as thirty pounds or even greater, depending upon the size of the hoist. When the lever 52 is set on the high pressure side, the hoist is adapted to counterbalance the predetermined load for which the high pressure side is set and which may be of any magnitude.

Fluid under pressure, such as air, is supplied through the pipe 64 to the control or control valve 50, and fluid under pressure as controlled by the valve 50 is supplied by pipe 66 to a duct 68 which communicates with one end 70 of the cylinder 12 on one side of the piston 14. The back pressure in the cylinder on the back side 72 thereof is controlled or regulated by an adjustable bleed valve 76 so that if the end 70 of the cylinder is subjected to the pressure of the high pressure side of the system when there is no load supported on the hook 40, the rate of movement of the piston will be regulated so as to provide a sort of dash pot action which will prevent the hook 40 from being violently jerked upward.

As shown in Fig. 6, the control 50 includes generally in addition to the operating lever 52, a high pressure regulator valve indicated generally at 78, a high pressure relief valve indicated generally at 80, a low pressure regulator valve indicated generally at 82, a low pressure relief valve indicated generally at 84, a metering valve indicated generally at 86, a rotary plug valve indicated generally at 88, and certain check valves, one of which is shown in Fig. 9.

The control 50 comprises a body 90 on which the valves just mentioned are mounted and which body 90 is provided with ducts, conduits or passageways interconnecting said valves, as will be understood from reference to Figs. 3 and 4 which are schematic illustrations of the control 50, Fig. 3 showing the control in the low pressure position and Fig. 4 showing the control set on the high pressure side.

The pipe 64 is connected to a passageway 92 which forms part of the line pressure side of the fluid pressure system. The pipe 66, which is in communication with the end 70 of the cylinder 12, is at its other end in communication with the passageway 94, which in turn communicates with the passageways 96 and 98. The passageway 98 communicates with the check valve chamber 100 on the downstream side of the check valve indicated generally at 102. The low pressure side of the fluid pressure system comprises the low pressure regulator valve 82, the check valve 102, and the low pressure relief valve 84.

As shown in Fig. 3, the line pressure passage 92 is connected by the V-passage 104 in the valve 88 to a passageway 106 which leads to the low pressure regulator valve 82. A passageway 108 leads from the controlled pressure side of the low pressure regulator valve 82 to the check valve 102, and from the check valve chamber 100 passageway 98 leads to the cylinder 12, as previously described. A passageway 110 extends between the pressure relief valve 84 and a V-passage 112 in the rotary valve 88, and a passageway 114 extends from the other end of the V-passageway 112 to the passage 98. A passageway 116 leads from the pressure relief valve 84 to atmospheric port 118, and the metering valve 86 is arranged between the passageways 116 and 118 for regulating the escape or exhaust of pressure fluid to atmosphere from the low pressure relief valve 84.

Assuming pressure fluid is present at a suitable pressure in the line pressure passageway 92 and with the parts arranged as shown in Fig. 3, the pressure of the fluid will be stepped down by the low pressure regulator valve 82 and supplied at the regulated pressure through the passage 108 past check valve 102 and through passages 98 and 94 to the cylinder 12, the valve 82 being set so as to provide a pressure in the end 70 of the cylinder which will counterbalance the load on the piston when there is no load supported on the hook 40. The hook 40 thus will stay at the elevation to which it may be moved by the operator.

If the operator pulls the hook 40 downwardly, the pressure in the end 70 of the cylinder and in the passages on the downstream side of the pressure regulator valve 82 will tend to rise, whereupon the pressure relief valve 84 will open so as to vent pressure fluid to the atmosphere. If the operator wishes to raise the hook 40, he merely applies a slight upward force thereto, which will have the effect of tending to decrease the pressure on the downstream side of the check valve 102, whereupon the pressure regulator valve 82 will open so as to supply additional pressure fluid to the end 70 of the cylinder. It will be observed that when the control 50 is set on the low pressure side, the line pressure side of the system is not connected to the high pressure side of the valve.

The high pressure side of the system comprises the high pressure regulator valve 78, the check valve 120, and the high pressure relief valve 80.

When the valve 88 is arranged as shown in Fig. 4, the line pressure side of the system is connected to the high pressure side thereof and disconnected from the low pressure side. With the valve 88 positioned so as to energize the high pressure side of the system, the V-passage 104 of the valve 88 connects the line pressure passage 92 to the passage 122 which leads to the high pressure side of the high pressure regulator valve 78. Passageway 124 leads from the controlled pressure side of the high pressure regulator 78 to the check valve 120, and passageway 96 leads from the check valve 120 on the downstream side thereof to the passage 94 which leads to the cylinder 12. At the same time V-passage 124 in the valve 88 connects passage 126 with passage 128 which leads to the high pressure relief valve 80, and the high pressure relief valve is ported to atmosphere through passage 130 and atmospheric port 132.

It should be pointed out at this time that the passage 112 of the valve 88, when the parts are arranged as shown in Fig. 4, does not interconnect passage 114 and passage 106 since passage 106 is at a different elevation than the V-passage 112, and also when the parts are arranged as shown in Fig. 3 the V-passage 124 does not interconnect passage 122 and the passage 96 since the V-passage 124 in the valve 88 is at a higher elevation than the passage 126.

Thus, with the parts arranged as shown in Fig. 4, high pressure fluid from the line pressure passage is supplied through the V-passage 104 of the valve 88 to the passage 122, thence to the high pressure regulator valve 78 where the pressure is regulated or controlled, and from the controlled side of the pressure regulator valve 78 pressure fluid is supplied through the passage 124 and past check valve 120 to the passage 96 and the passage 94, and through the pipe 66 to the end 70 of the cylinder. At the same time the V-passage 124 and the passage 126 form a communication between the passage 96 and the passage 128 which leads to the high pressure relief valve 80. The high pressure regulator valve 78 is adjusted so as to supply pressure fluid to the end 70 of the cylinder at a pressure which will counterbalance the predetermined load on the hook 40. Thus, such load on hook 40 will remain at the elevation to which it is moved by the operator, and the operator in order to raise or lower such load need only apply a slight pressure thereto.

Thus, by applying downward pressure on the load supported on the hook 40, the pressure on the high pressure side of the system downstream of the high pressure regulator valve 78 will tend to rise, whereupon the pressure relief valve 80 will open so as to vent pressure fluid to the atmosphere.

If the operator moves the load on the hook 40 upwardly by applying a slight pressure thereto, the decrease in pressure on the high pressure side of the system downstream of the high pressure valve 78 will permit the high pressure regulator valve 78 to open so as to supply additional pressure fluid to the cylinder end 70. It will be observed that when the high pressure side of the system is energized as shown in Fig. 4, the low pressure relief valve 84 is cut off from the high pressure side of the system by the valve 88, and also that when the low pressure side of the system is energized as shown in Fig. 3, the high pressure relief valve 80 will be cut off from the low pressure side of the system.

The metering valve 86 prevents the sudden release of high pressure fluid from the end 70 of the cylinder if the valve 88 is shifted to the low pressure side when there is a load on the hook 40 so as to prevent the load from falling at such time, the valve 86 functioning to release the high pressure air at a slow enough rate so that the load on the hook 40 will fall at a very slow rate.

The pipe 64 which is connected with a source of pressure fluid at a suitable pressure is connected to the valve body 90 by coupling nut 134 and a strainer 136 may be arranged in the line pressure passage 92. The line pressure passage 92 opens into the chamber 142 in which the rotary plug valve 88 is arranged for alignment with either end of the V-passage 104, depending upon the setting of the valve 88. With the valve 88 set as shown in Figs. 3, 5 and 6, the other end of the V-passage 104 connects with passage 106 as shown in Fig. 7, for supplying pressure fluid to the high pressure side of the low pressure regulator valve 82. The construction of both of the regulator valves 78 and 82 is the same, and hence the description of the valve 82 will suffice for both valves.

The valve 82 includes a valve member 144 having a face 146 of rubber or similar material which is biased against an annular valve seat 148 by spring 150. A pin 152 carried by the valve member 144 is adapted to be engaged by a button 154 carried by flexible diaphragm 156. A spring 158 reacts against the diaphragm 156, and the pressure with which the spring 158 bears against the diaphragm is regulated by the screw 160 which is threadedly adjustable in the cap 164 of the valve member 82, but is normally locked in position by lock nut 166. When the lock nut 166 is loose the screw 160 may be adjusted so as to increase or decrease the pressure with which the spring 158 bears against the diaphragm 156 so as to set the valve for the desired pressure.

The valve face 146 is shown seated in Fig. 8. When this valve member is unseated from the seat 148, pressure fluid may flow from the passage 106 through the valve seat 148 through valve chamber 170 to passage 108. However, if the pressure in the chamber 170 exceeds the pressure for which the valve is set, the diaphragm 156 will move upwardly and permit the spring 150 to seat the valve face 146 on the valve seat 148. If the pressure in the chamber 170 falls below the pressure for which the valve is set, the spring 158 will cause the button 154 to react on the pin 152 to unseat the valve face 146 from the seat 148. The manner in which this valve may be adjusted to vary the pressure is the same as that for the pressure relief valve shown in Fig. 5. Both the pressure regulating and pressure relief valves are conventional forms of valves, and in lieu of the specific types illustrated other types may be employed.

Both of the check valves 102 and 120 comprise an annular valve seat 180, a valve member 182, a valve face 184, and a spring 186 which reacts on the valve member 182 so as to urge the face 184 against the seat 180. As is characteristic of check valves, they open under a very slight pressure difference and are normally closed.

The pressure relief valve 84 is set for the same pressure for which the pressure regulating valve 82 is set and is designed to release pressure from the pressure controlled side of the system in excess of that for which the pressure is set. In this case a diaphragm 200 has secured thereon a valve face 202 which is engageable with an annular valve seat 204 in its closed position. The valve seat communicates with passage 116 which is provided with a valve seat 206 which forms a part of the metering valve 86.

The metering valve 86 further includes a movable valve member 208 which may be adjusted so as to regulate the orifice for the escape or exhaust of air from the passage 116 to the atmospheric port 118. The metering valve is set so as to give a sort of dash pot action to the piston 14 when the control lever is shifted from the high pressure to the low pressure side. Since the valve 208 is threadedly mounted on the valve body, the size of the metering orifice regulated thereby may be adjusted as desired.

The diaphragm 202 of the pressure relief valve is backed up by a spring 210 which in turn is backed by a disc 212. Screw 214 threadedly secured in the cap of the valve 84 reacts against the disc 212 and may be adjusted in the cap so as to regulate the pressure at which the valve 84 will open. The diaphragm is exposed to the pressure in the chamber 216 which communicates with passage 110. The construction of the high pressure relief valve 80 is the same as that of the low pressure relief valve except that the high pressure relief valve 80 is set for the same pressure as the high pressure regulator valve 78. The pressure at which the valves 78, 80, 82 and 84 are set of course is dependent upon the predetermined loads that are to be counterbalanced by the hoist. The valve 88 is biased into the valve chamber 142 by a spring 220 which reacts against a thrust bearing 222. The valve 88 is provided with a shank 224 to which the lever 52 is secured.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. A dual load balancer comprising a cylinder, a piston operatively arranged in said cylinder for movement relative thereto, load supporting means connected to one of said members, a support for the other of said members, a fluid pressure system connected to one end of said cylinder on one side of said piston for supplying fluid under pressure to said end of said cylinder, said system including a high pressure side adapted to supply to said end of said cylinder pressure fluid at a pressure which will counterbalance a predetermined load to be supported by said means, an adjustable pressure regulator for regulating the pressure of said high pressure side, a low pressure side adapted to supply to said end of said cylinder pressure fluid at a pressure which will counterbalance a different predetermined load on said means, an adjustable pressure regulator for regulating the pressure of said low pressure side, and a control comprising a rotary valve operable for selectively subjecting said end of said cylinder to the pressure of the high and low pressure sides of said system.

2. A dual load balancer comprising a cylinder, a piston operatively arranged in said cylinder for movement relative thereto, load supporting means connected to one of said members, a support for the other of said members, a fluid pressure system connected to one end of said cylinder on one side of said piston for supplying fluid under pressure to said end of said cylinder, said system including a high pressure side adapted to supply to said end of said cylinder pressure fluid at a pressure which will counterbalance a predetermined load to be supported by said means, a low pressure side adapted to supply to said end of said cylinder pressure fluid at a pressure which will counterbalance the weight of said means, and a control operable for selectively subjecting said end of said cylinder to the pressure of the high and low pressure sides of said system.

3. A dual load balancer according to claim 2 wherein the other end of said cylinder is provided with a metering device for regulating the flow of fluid out of said other end of said cylinder.

4. A multiple load balancer comprising a cylinder, a piston operatively arranged in said cylinder for movement relative thereto, load supporting means connected to one of said members, a fluid pressure system connected to one end of said cylinder on one side of said piston for supplying fluid under pressure to said end of said cylinder, said system including a high pressure side adapted to supply to said end of said cylinder pressure fluid at a pressure which will counterbalance a predetermined load supported by said means, a low pressure side adapted to supply to said end of said cylinder pressure fluid at a pressure which will counterbalance a different predetermined load on said means, and a control operable for selectively subjecting said end of said cylinder to the pressure of the high and low pressure sides of said system.

5. A dual load balancer comprising a cylinder, a piston operatively arranged in said cylinder for movement relative thereto, load supporting means connected to one of said members, a fluid pressure system connected to one end of said cylinder on one side of said piston for supplying fluid under pressure to said end of said cylinder, said system including a high pressure side adapted to supply to said end of said cylinder pressure fluid at a pressure which will counterbalance a predetermined load supported by said means, a low pressure side adapted to supply to said end of said cylinder pressure fluid at a pressure which will counterbalance a different predetermined load on said means, and a control operable for selectively subjecting said end of said cylinder to the pressure of the high and low pressure sides of said system, said high and low pressure sides each including a pressure regulator valve, a passageway adapted to connect said pressure regulator valve to the line pressure side of said fluid pressure system, a passageway forming a communication between the controlled pressure side of said pressure regulator valve and said end of said cylinder, a pressure relief valve ported to atmosphere, and a passageway adapted to connect said pressure relief valve to the controlled pressure side of said pressure regulator valve.

6. A load balancer according to claim 5 wherein said control comprises rotary valve means forming part of said first and last mentioned passageways for controlling the flow of pressure fluid therethrough.

7. A load balancer according to claim 5 including a check valve in said passageways between said pressure regulator valve and said end of said cylinder, said check valve also being operatively disposed in the passageway between said pressure relief and said pressure regulator valves.

8. A dual load balancer comprising a cylinder, a piston operatively arranged in said cylinder for movement relative thereto, load supporting means connected to one of said members, a fluid pressure system connected to one end of said cylinder on one side of said piston for supplying fluid under pressure to said end of said cylinder, said system including a high pressure side adapted to supply to said end of said cylinder pressure fluid at a pressure which will counterbalance a predetermined load supported by said means, a low pressure side adapted to supply to said end of said cylinder pressure fluid at a pressure which will counterbalance a different predetermined load on said means, and a control operable for selectively subjecting said end of said cylinder to the pressure of the high and low pressure sides of said system, said high and low pressure sides each including a pressure regulator valve, a passageway adapted to connect said pressure regulator valve to the line pressure side of said fluid pressure system, a passageway forming a communication between the controlled pressure side of said pressure regulator valve and said end of said cylinder, a pressure relief valve ported to atmosphere, a branch passageway adapted to connect said pressure relief valve to the controlled pressure side of said pressure regulator valve, a check valve in said last two mentioned passageways on the downstream side of said pressure regulator valve, and rotary valve means forming part of said first and last mentioned passageways for controlling the flow of pressure fluid therethrough and comprising at least a part of said control, said valve means in one position thereof connecting certain of said passageways on the high pressure side of said system so as to connect said end of said cylinder to the line pressure side of said system through said pressure regulator valve of the high pressure side of said system and said valve means in another position thereof connecting certain of said passageways on the low pressure side of the system so as to connect said end of said cylinder to the line pressure side of said system through said pressure regulator valve of the low pressure side of the system.

9. A dual load balancer comprising a cylinder, a piston operatively arranged in said cylinder for movement relative thereto, load supporting means connected to one of said members, a support for the other of said members, a fluid pressure system connected to one end of said cylinder on one side of said piston for supplying fluid under pressure to said end of said cylinder, said system including a high pressure side adapted to supply to said end of said cylinder pressure fluid at a pressure which will counterbalance a predetermined load supported by said means, a low pressure side adapted to supply to said end of said cylinder pressure fluid at a pressure which will counterbalance the weight of said means, a line pressure side for supplying pressure fluid to said high and low pressure sides, and a control operable for selectively connecting and disconnecting the high and low pressure sides of said system to and from said line pressure side of said system.

10. A dual load balancer according to claim 9 wherein said high and low pressure sides each includes a pressure regulator valve, a passageway adapted to connect said pressure regulator valve to the line pressure side of said fluid pressure system, a passageway forming a communication between the controlled pressure side of said pressure regulator valve and said end of said cylinder, a pressure relief valve ported to atmosphere, a passageway adapted to connect said pressure relief valve to the controlled pressure side of said pressure regulator valve, and rotary valve means forming part of said first and last mentioned passageways for controlling the flow of pressure fluid therethrough and comprising at least a part of said control.

11. A dual load balancer according to claim 9 wherein said high and low pressure sides each includes a pressure regulator valve, passageways opened and closed by said control and adapted to connect said pressure regulator valve to the line pressure side of said fluid pressure system, a passageway forming a communication between said pressure regulator valve and said end of said cylinder, a pressure relief valve ported to atmosphere, passageways opened and closed by said control and adapted to connect said pressure relief valve to the controlled pressure side of said pressure regulator valve, and a check valve in the passageway on the downstream side of said pressure regulator valve, said check valve also being disposed in the passageways between said pressure regulator and relief valves.

12. A dual load balancer according to claim 9 wherein said high and low pressure sides each includes a pressure regulator valve, passageways opened and closed by said control and adapted to connect said pressure regulator valve to the line pressure side of said fluid pressure system, a passageway forming a communication between said pressure regulator valve and said end of said cylinder, a pressure relief valve ported to atmosphere, passageways opened and closed by said control and adapted to connect said pressure relief valve to the controlled pressure side of said pressure regulator valve, a check valve in the passageway on the downstream side of said pressure regulator valve, said check valve also being disposed in the passageways between said pressure regulator and relief valves, and a metering valve controlling the atmospheric port of said pressure relief valve on the low pressure side of said system for regulating the exhaust of high pressure fluid from said end of said cylinder when said control is operated to disconnect the high pressure side of the system from the line pressure side and to connect the low pressure side of the system to the line pressure side thereof.

13. A load balancer comprising a cylinder, a piston operatively arranged in said cylinder for movement relative thereto, load supporting means connected to one of said members, a support for the other of said members, a fluid pressure system connected to one end of said cylinder on one side of said piston for supplying fluid under pressure to said end of said cylinder, said system including a line pressure side adapted to be connected to said end of said cylinder so as to supply thereto pressure fluid at a pressure which will counterbalance a predetermined load to be supported by said means, an adjustable pressure regulator valve for regulating the supply of pressure fluid from the line pressure side of said system to said cylinder, a check valve in the connection between said pressure regulator valve and said cylinder, and a pressure relief valve ported to atmosphere and in communication with said end of said cylinder.

HENRY T. PLATZ.

REFERENCES CITED

The following references are of record in the file of this patent:

UNITED STATES PATENTS

| Number | Name | Date |
|---|---|---|
| 1,962,459 | Ostlund | June 12, 1934 |
| 2,071,605 | Anthony et al. | Feb. 23, 1937 |
| 2,176,979 | Platz | Oct. 24, 1939 |
| 2,248,730 | Wood | July 8, 1941 |